United States Patent
Casey et al.

[11] Patent Number: 6,014,293
[45] Date of Patent: Jan. 11, 2000

[54] SINGLE REEL CARTRIDGE ERASURE PREVENTING DEVICE HOUSING WITH POST

[75] Inventors: Larry J. Casey; Curtis G. LeNoue; Todd R. Person, all of Wahpeton, N. Dak.

[73] Assignee: Imation Corp., Oakdale, Minn.

[21] Appl. No.: 08/231,258

[22] Filed: Apr. 22, 1994

[51] Int. Cl.[7] ................................. G11B 23/02
[52] U.S. Cl. ............................................. 360/132
[58] Field of Search .............................. 360/132, 60, 95, 360/96.5

[56] References Cited

U.S. PATENT DOCUMENTS

| | | | |
|---|---|---|---|
| 4,554,603 | 11/1985 | Tsuchiya | 360/132 |
| 4,642,721 | 2/1987 | Georgens et al. | 360/132 |
| 4,962,898 | 10/1990 | Lee | 360/132 |
| 5,234,178 | 8/1993 | Schoettle et al. | 360/132 |

FOREIGN PATENT DOCUMENTS

| | | |
|---|---|---|
| 0 040 686 | 12/1981 | European Pat. Off. . |
| 0 040 687 | 12/1981 | European Pat. Off. . |
| 92 11 029 U | 1/1993 | Germany . |
| 5 36233 | 2/1993 | Japan . |

*Primary Examiner*—Allen T. Cao
*Attorney, Agent, or Firm*—Eric D. Levinson

[57] ABSTRACT

A single reel data tape cartridge includes an erasure preventing device which is rotatable in a cartridge opening. The thumbwheel has a central portion which is exposed through an opening and two end portions. The cover includes a holder for holding the erasure preventing device to expose the central portion through the opening. The holder includes a boss for receiving an end portion of the erasure preventing device, and a post located within the boss and extendable into the opening in the end portion of the erasure preventing device. The post can be tapered and the height of the post can be greater than the height of the boss. The base can include a boss for receiving one end portion of the erasure preventing device.

7 Claims, 3 Drawing Sheets

6,014,293

SINGLE REEL CARTRIDGE ERASURE PREVENTING DEVICE HOUSING WITH POST

TECHNICAL FIELD

The present invention relates to single reel tape cartridges using tape cartridge erasure preventing devices. More particularly, the present invention relates to single reel tape cartridges using erasure preventing devices with improved assembly characteristics.

BACKGROUND OF THE INVENTION

Single reel data tape cartridges, one generation of which is known as 3480 type cartridges, include a reel containing magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages an inclined surface of the corner of the cartridge. The rear surface is rounded to form a portion of an arc of a radius to match the periphery of the take-up reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus which connects to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes a roller guide, an air bearing guide, a magnetic transducer head, a second air bearing guide, and a roller of a tension transducer.

The tape drive apparatus also includes a mechanism which interacts with the tape cartridge to sense whether the tape is write-enabled and can be erased and recorded over or whether the tape is write-protected and can not be erased. Typical erasure preventing devices for these single reel cartridges incorporate a mechanism that senses whether a record opening in a wall of the cassette is blocked or unblocked. When the opening is unblocked, the recording function is disabled to prevent accidental erasure.

One type of erasure preventing device is a cylindrical thumbwheel which is rotatable in an opening in the front wall of the cartridge near the corner opposite the corner that has the leader block window. The thumbwheel has a larger diameter central portion which is exposed through the opening and two smaller diameter end portions which are received and rotatable in bosses in the cartridge housing. The central portion includes a flat section which corresponds in size and shape to the opening in the front wall of the cartridge. When the flat section registers with the opening, the tape is write-protected. When the thumbwheel is rotated so the flat section does not register with the opening, the tape is write-enabled.

The two end portions of the thumbwheel are received in and are rotatable in a thumbwheel holder formed in the housing. The holder includes a boss in the cartridge base which receives one end portion and a boss in the cartridge cover 36' which receives the other end portion. The cover boss is shown in FIGS. 4 and 5. However, the thumbwheel can be misaligned during assembly, sometimes resulting in cartridges that do not function properly. There is a need for a cartridge which can reduce the incidents of misplaced erasure preventing devices.

SUMMARY OF THE INVENTION

The single reel data tape cartridge cover of the present invention includes an upper wall, a rear wall, two side walls, and a front wall having a record opening which can interact with a cartridge drive system. A holder is located adjacent the front wall opening for holding an erasure preventing device to expose the central portion through the opening. The holder includes a boss for receiving the end portion of the erasure preventing device, and a post located within the boss and extendable into the opening in the end portion of the erasure preventing device.

The cover is part of a single reel data tape cartridge which includes a reel of magnetic tape with a leader block attached to the free end of the tape as it extends from the reel. The tape cartridge is used within a tape drive apparatus which includes a device which interacts with the tape cartridge to sense whether the tape is write-enabled or whether the tape is write-protected. The erasure preventing device can be a cylindrical thumbwheel which is rotatable in the opening. The thumbwheel has a central portion which is exposed through the opening and two end portions.

The post can be tapered and the height of the post can be greater than the height of the boss. The engagement of the post within the end portion hole improves the assembly of the cover to the base, permits positive placement and alignment of the erasure preventing device in the housing during the final assembly of the cover to the base, aligns the erasure preventing device during assembly, and does not allow the cover and base to be assembled if the thumbwheel is severely out of position.

The base, which includes a lower wall, a rear wall two side walls, and a front wall, can include a boss for receiving one end portion of the erasure preventing device.

DETAILED DESCRIPTION OF PREFERRED EMBODIMENTS

Figure 1:
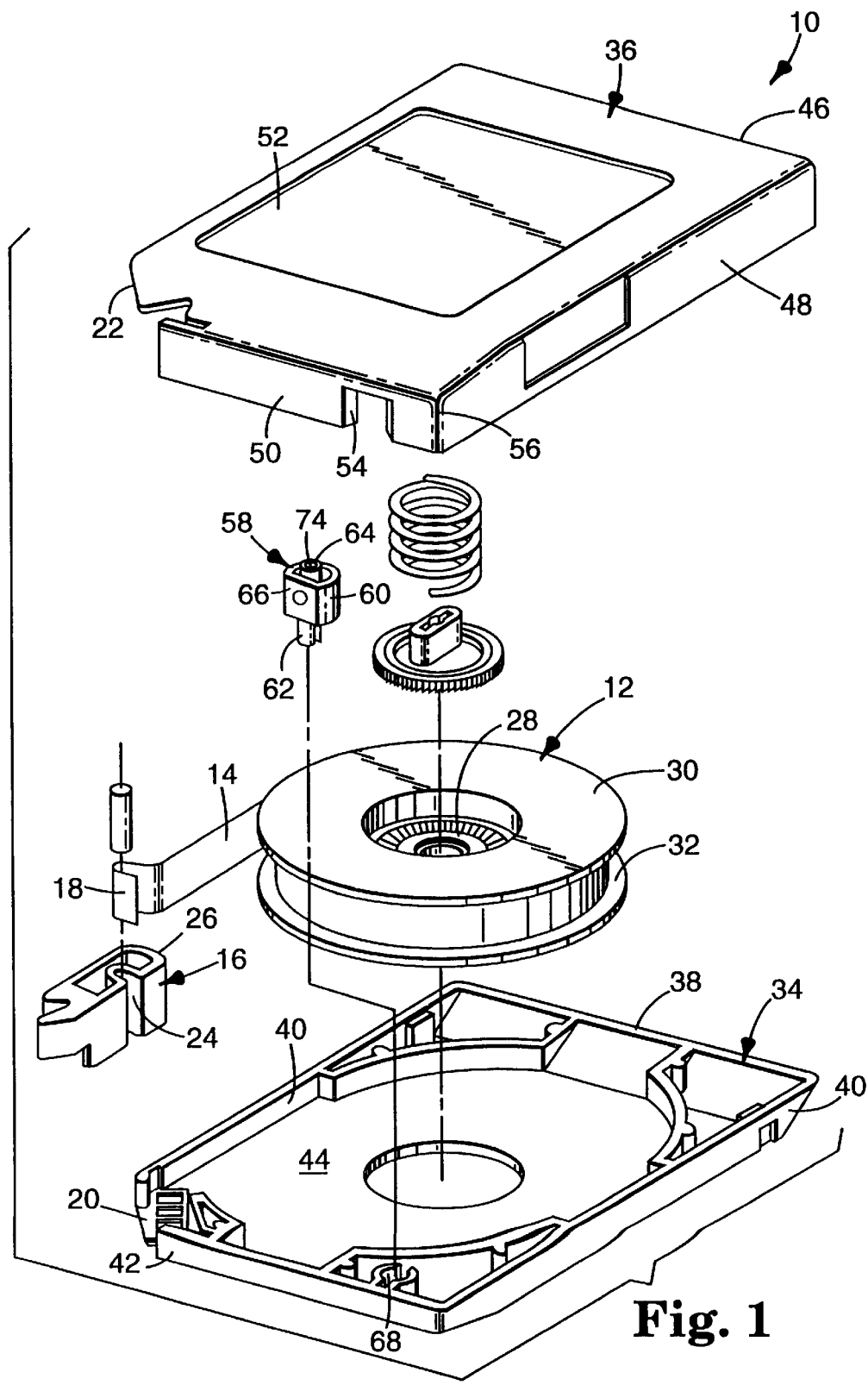
FIG. 1 is an exploded perspective view of a single reel cartridge having a thumbwheel according to the present invention.

A single reel data tape cartridge 10, such as a 3480 or 3490 type tape cartridge shown in FIG. 1, includes a reel 12 containing magnetic tape 14 with a leader block 16 attached to the free end 18 of the tape 14. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window is covered.

The front surface of the leader block 16 includes a slot 24 for engaging an automatic threading apparatus of a reel-to-reel magnetic tape drive apparatus and is generally cylindrical, having a rounded boss which engages an inclined surface of the corner of the cartridge 10. The rear surface is rounded 26 to form a portion of an arc of a radius to match the periphery of the take-up reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the take-up reel. The tape reel 12 includes a cylindrical hub 28 having a cylindrical tape winding surface, an upper flange 30 mounted on one axial end of the hub, and a lower flange 32 mounted on the other axial end of the hub.

The cartridge 10 is formed of a base 34 and a cover 36 which combine to form a housing. The base 34 includes a rear wall 38, two opposing side walls 40, a front wall 42, and a lower wall 44 connecting the rear, front, and side walls. The cover 36 includes a rear wall 46, two opposing side walls 48, a front wall 50, and an upper wall 52 connecting the rear, front, and side walls. The lower wall 44 and the upper wall 52 are the major walls of the housing.

The front wall 42, 50 of the cartridge has a record opening 54, near the corner 56 opposite the corner that has the leader block window 22, which can interact with the cartridge drive system. An erasure preventing device is located in the record opening 54. The erasure preventing device moves within the record opening 54 from a first position in which the tape 14 is write-enabled and can be erased to a second position which causes the tape drive apparatus mechanism to disable the recording function to prevent accidental erasure; the tape 14 is write-protected and cannot be erased.

As shown, the erasure preventing device is a cylindrical thumbwheel 58 which is rotatable in the opening 54. The thumbwheel 58 has a larger diameter central portion 60 which is exposed through the opening and two smaller diameter end portions 62, 64. One end portion 62, 64 is located on each axial end of the central portion 60. The central portion 60 includes a flat section 66 which corresponds in size and shape to the opening 54 in the front wall 50 of the cartridge 10. When the thumbwheel 58 is rotated so the flat section 66 registers with the opening 54, the tape 14 is write-protected. When the thumbwheel 58 is rotated so the flat section 66 does not register with the opening 54, the tape 14 is write-enabled.

Figure 2:
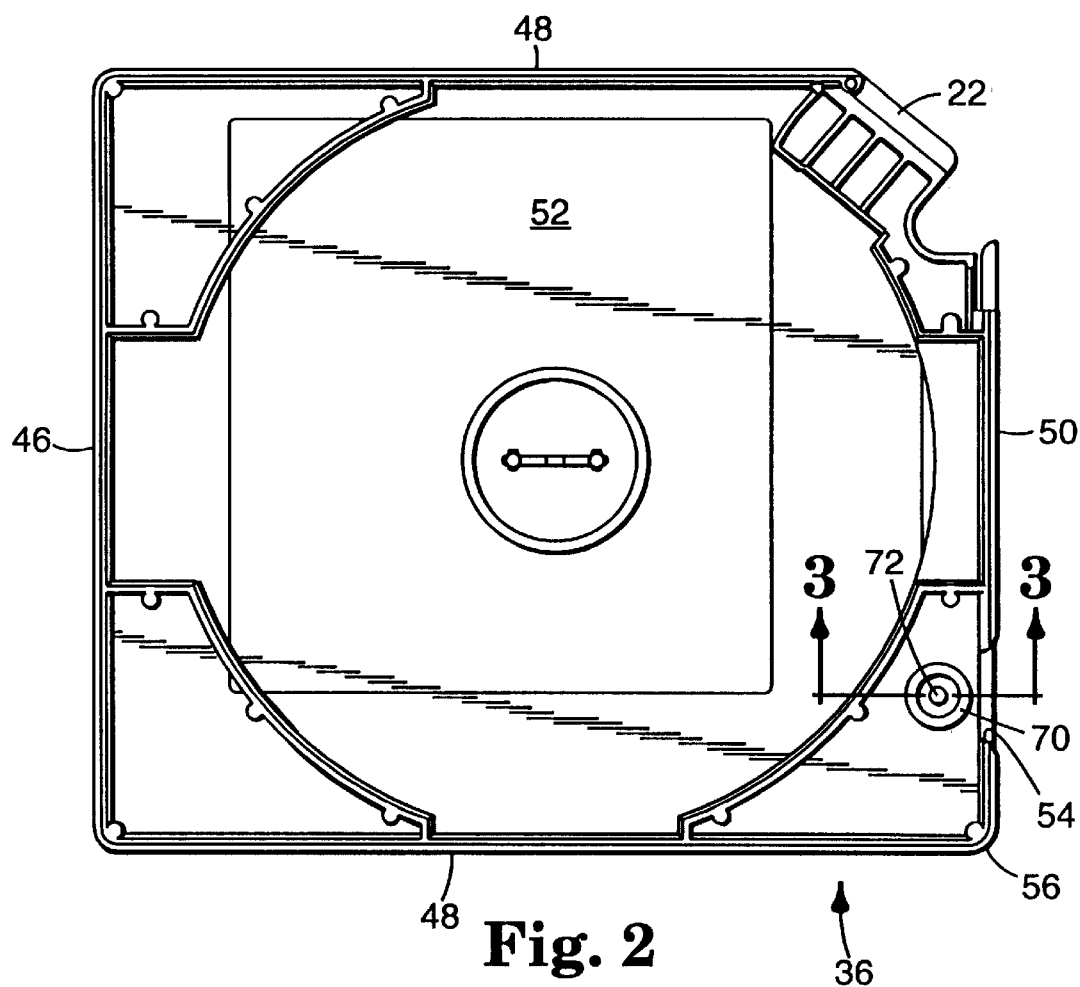
FIG. 2 is a bottom view of the cartridge cover of the cartridge of FIG. 1.
Figure 3:
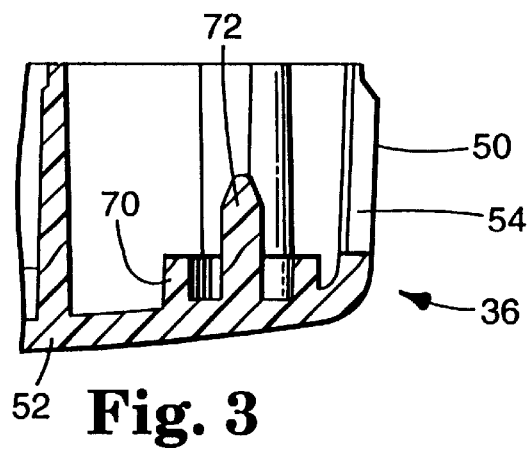
FIG. 3 is a cross-sectional view taken along line 3—3 of FIG. 2.

The two end portions 62, 64 of the thumbwheel 58 are received in and are rotatable in a thumbwheel holder formed in the housing. The holder includes a boss 68 in the cartridge base 34. The end portion 62 is received in the base boss 68. The holder also includes a boss 70 in the cartridge cover 36, as shown in FIGS. 2 and 3. The end portion 64 is received in the cover boss 70. The holder also includes a tapered post 72 mounted in the cover 36 in the center of the cover boss 70. The tapered post 72 extends beyond the boss 70 and is received in a hole 74 formed in the end of the end portion 64.

Figure 4:
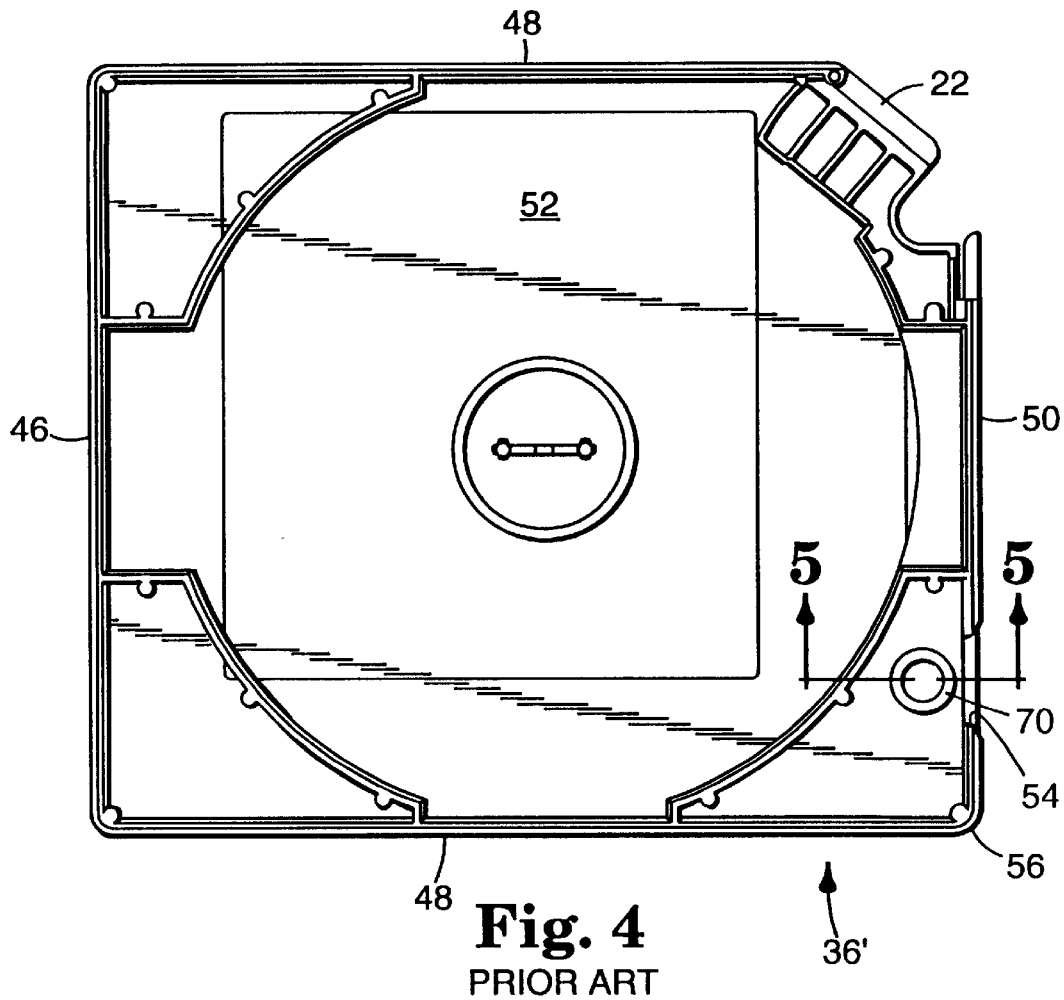
FIG. 4 is a bottom view of the cartridge cover of a known cartridge.
Figure 5:
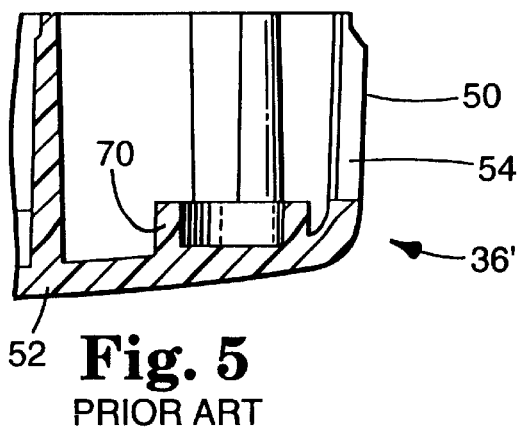
FIG. 5 is a cross-sectional view taken along line 5—5 of FIG. 4.

The engagement of the tapered post 72 within the end portion hole 74 improves the assembly of the cover 36 to the base 34. The engagement permits positive placement and alignment of the thumbwheel in the housing during the final assembly. If the thumbwheel is slightly out of alignment, the tapered post 72 aligns it during assembly. If the thumbwheel is severely out of position, the tapered post 72 does not allow the housing members to be assembled. This improves alignment of the thumbwheel, reduces welding variations due to the thumbwheel being misaligned, and prevents final assembly of cartridges with misplaced thumbwheels. These are advantages over the known cartridges, as shown in FIGS. 4 and 5, which do not use the post as part of the thumbwheel holder.

Various changes and modifications may be made by one skilled in the art without departing from the scope or spirit of the invention. For example, the erasure preventing device need not be a thumbwheel but can be any rotating member. Also, the tapered post can be located in the base to engage the other end of the erasure preventing device.

We claim:

1. A tape cartridge cover for use with an erasure preventing device, wherein the erasure preventing device comprises an end portion, wherein the end portion has an opening, wherein the cover comprises:

a primary wall;

a rear wall;

two side walls;

a front wall having an opening which is adapted to interact with a cartridge drive system; and means, located adjacent the front wall opening, for holding the erasure preventing device, wherein the holding means comprises a boss for receiving the end portion of the erasure preventing device, and a post located within the boss and extendable into the opening in the end portion of the erasure preventing device less than half way into the erasure preventing device to align the cover to the erasure preventing device during assembly.

2. The cover of claim 1 wherein the post is tapered.

3. The cover of claim 1 wherein the height of the post is greater than the height of the boss.

4. The cover of claim 1 wherein the cartridge is a single reel tape cartridge, wherein the cover is adapted to be assembled to a base to form a housing, and wherein the engagement of the post within the end portion opening improves the assembly of the cover to the base, permits positive placement and alignment of the erasure preventing device in the housing during the final assembly, aligns the erasure preventing device during assembly, and does not allow the cover and base to be assembled if the erasure preventing device is severely out of position.

5. A single reel tape cartridge housing for use with an erasure preventing device, wherein the erasure preventing device comprises a central portion and first and second end portions located on respective axial ends of the central portion, wherein the second end portion has an opening, wherein the housing comprises:

a base comprising a base lower wall; a base rear wall; two base side walls; and a base front wall;

a cover comprising a cover upper wall; a cover rear wall; two cover side walls; and a cover front wall having an opening which is adapted to interact with a cartridge drive system; and means for holding the erasure preventing device to expose the central portion through the opening comprising a base boss, located adjacent the base front wall, for receiving the first end portion of the erasure preventing device; a cover boss, located adjacent the cover front wall opening, for receiving the second end portion of the erasure preventing device; and a post located within the cover boss and extendable into the opening in the second end portion of the erasure preventing device less than half way into the erasure preventing device.

6. A single reel tape cartridge comprising:

a reel of tape;

an erasure preventing device which is adapted to interact with a cartridge drive system, wherein the erasure preventing device comprises a central portion and first and second end portions located on respective axial ends of the central portion, wherein the second end portion has an opening;

a base comprising a base lower wall; a base rear wall; two base side walls; and a base front wall;

a cover which combines with the base to form a housing for the reel of tape, wherein the cover comprises a cover upper wall; a cover rear wall; two cover side walls; and a cover front wall having an opening which is adapted to interact with a cartridge drive system; and means for holding the erasure preventing device to expose the central portion through the opening, wherein the holding means comprises a base boss, located adjacent the base front wall, for receiving the first end portion of the erasure preventing device; a cover boss, located adjacent the cover front wall opening, for receiving the second end portion of the erasure preventing device; and a post located within the cover boss and extendable into the opening in the second end portion of the erasure preventing device less than half way into the erasure preventing device.

7. An erasure preventing device for use in a single reel tape cartridge comprising:

a larger diameter central portion;

a first smaller diameter end portion located on one axial end of the central portion;

a second smaller diameter end portion located on the axial end of the central portion opposite the first smaller diameter end portion, wherein the end of the second smaller diameter end portion has an opening for receiving a post less than half way into the erasure preventing device to locate and secure the erasure preventing device in the single reel tape cartridge.

* * * * *